United States Patent [19]
Wilton

[11] 3,981,534
[45] Sept. 21, 1976

[54] SEAT COVER FASTENING SYSTEM

[75] Inventor: William L. Wilton, Waukesha, Wis.

[73] Assignee: Universal Oil Products Company, Des Plaines, Ill.

[22] Filed: June 27, 1975

[21] Appl. No.: 591,205

[52] U.S. Cl. .............................. 297/219; 5/353.1; 297/218
[51] Int. Cl.² ......................................... A47C 27/00
[58] Field of Search ........................ 5/353.1–353.6; 297/218, 219, 455

[56] References Cited
UNITED STATES PATENTS 2,646,840  7/1953  Good .......................... 5/353.4 X
3,506,987  4/1970  Bielak .......................... 297/218 X Primary Examiner—James C. Mitchell
Attorney, Agent, or Firm—James R. Hoatson, Jr.; Barry L. Clark; William H. Page, II

[57] ABSTRACT

An extruded, generally J-shaped plastic welt or trim strip adapted to be sewn to a seat cover has an inverted lip portion at the tip of its short leg. The welt strip is adapted to cover both sides of a vertical, downwardly extending peripheral flange on a metal seat pan. The welt strip is retained against removal from the seat pan by the engagement of its inverted lip portion with a plurality of upwardly and inwardly directed tabs which are struck out of the material of the flange.

6 Claims, 7 Drawing Figures

U.S. Patent  Sept. 21, 1976  3,981,534
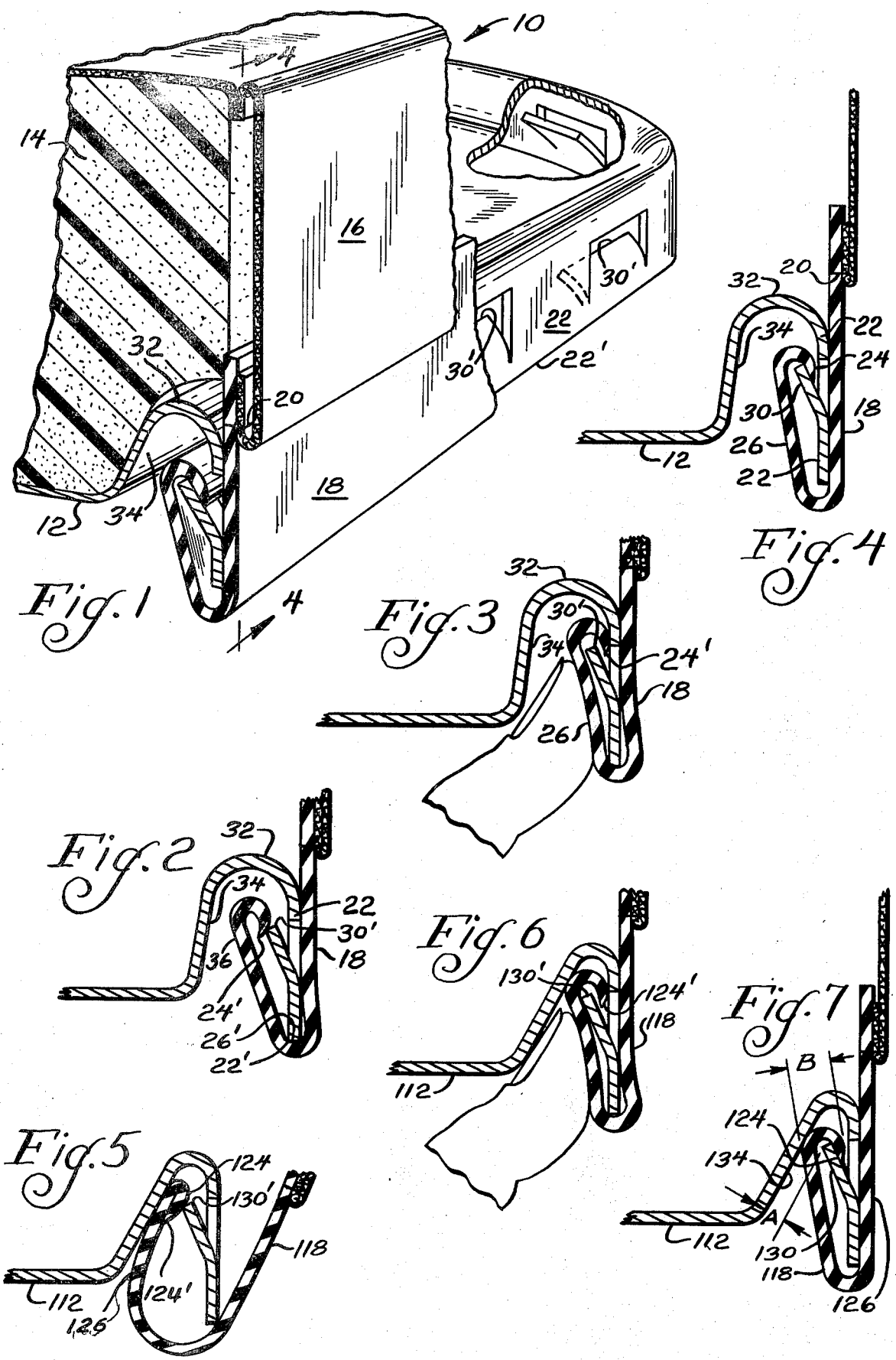

SEAT COVER FASTENING SYSTEM

BACKGROUND OF THE INVENTION

The invention relates to a seat cover fastening system for seats, and particularly for seats such as are used on trucks and tractors where a covered pad or cushion of resilient material is placed on top of a formed metal seat pan and held thereto by a welt or trim strip which engages both the seat cover and a generally vertical peripheral flange on the seat pan. Examples of prior art seats of this type are shown in British Pat. Nos. 752,215 and 839,143 and in U.S. Pat. No. 3,423,775. In the seats shown in the British patents, a generally J-shaped welt is attached at its top to the seat cover fabric while the bottom is slipped over the lower edge of the seat flange and held in contact therewith by friction. The aforesaid welts can quite easily be removed by pulling them downwardly and thus can be readily vandalized. Furthermore, if the seats on which such welts are used have any substantial amount of padding under the seat cover, the compression of the padding by the seat occupant can tend to force the welt to move downwardly and thus become disengaged from the seat pan flange. U.S. Pat. No. 3,423,775 to Cockerill solves the problem of the seat cover on a cushioned seat becoming unattached during use by wrapping the upholstery material over the flange edge, stepping the flange, and holding the upholstery with a shouldered trim strip which engages the flange steps. In a preferred embodiment, metal clips with barbs are either molded into the trim strip or applied individually to the seat pan. The latter technique is preferred since it serves to anchor the seat cover to the seat pan and correctly position it before the final trim strip is applied. This prior art fastening means is time consuming and relatively costly in that many specially formed clips are used and each one must be manually attached to the seat pan. Furthermore, the seat covers on different seats are not necessarily uniform since the installer can vary the amount of material which is folded over the edge of the flange with the result that successively assembled seats may have covers which are either looser or tighter than desired.

SUMMARY

It is among the objects of the present invention to provide a seat cover fastening system which provides excellent and uniform cover retention at a minimum cost and with a minimum expenditure of labor during assembly.

The improved fastening system comprises the use of a specially formed welt and a specially formed seat pan with a peripheral cross-section having an inverted "U" shape. The welt is preferably made of extruded plastic in a generally "J"-shape cross-section. The long leg of the welt cross-section is adapted to be sewn or otherwise attached to the seat cover material. The short leg of the welt cross-section extends upwardly generally parallel to the long leg and cooperates therewith to cover and engage the sides and bottom edge of an outer vertical flange on the seat pan member. A downwardly and outwardly projecting lip on the upper end of the short leg of the "J"-shaped cross-section is designed to cooperate with upwardly and inwardly extending tab portions struck out of the material of the seat pan outer vertical flange. The spacing between the lower end of the lip and the bottom inside portion of the "J"-shaped cross-section is slightly less than the distance between the top tip end of the metal tab portions and the lower edge of the flange. Thus, once the lip is engaged behind the tabs, the welt cannot accidently become free of interlocking engagement with the flange. The closeness of the side walls of the seat pan U-shaped edge prevent one from getting his fingers above the welt and thus make it impossible for a vandal to remove the seat cover by pulling down on the welt, although, with great difficulty, one familiar with the seat construction could possibly remove the cover by starting at an end of the welt and using a tool to pry the lip up and over each tab.

Assembly of the welt and lip to the seat flange and tabs is quite simple and can be accomplished by squeezing the leg portions of the welt together while pushing the welt upwardly on the seat pan flange. The squeezing increases the distance between the lip and the bottom of the J-shaped cross-section and makes it possible for the tip of the lip to snap over the tip of the tabs. The snap lock action is further aided by the fact that the tip of the lip portion is slightly spaced from the short leg of the welt and thus free to pivot slightly upwardly as it is engaged by the tabs.

In a modified design, which is particularly effective at the corners of a seat pan, the seat pan edge has an inverted "V"-shape cross-section with the inner wall spaced so close to the tips of the tabs that the lip portion of the welt must be substantially compressed before it will pass through the space. Once the lip portion resiliently snaps past the tab as the welt is pushed upwardly during assembly, it cannot be removed since the lip will engage the back of the tabs.

BRIEF DESCRIPTION OF THE DRAWINGS

FIG. 1 is a perspective, broken away view of a seat illustrating the improved seat cover fastening system;

FIGS. 2 and 3 are sectional views similar to FIG. 4 which illustrate the relationship of the welt and the seat pan tabs before and during assembly;

FIG. 4 is a sectional view taken on line 4—4 in FIG. 1 showing the welt assembled to the seat pan;

FIG. 5 is a sectional view similar to FIG. 2 showing a modified seat pan configuration;

FIG. 6 is a sectional view similar to FIG. 3 showing the modified seat pan of FIG. 5; and FIG. 7 is a sectional view similar to FIG. 4 showing the modified seat pan of FIG. 5.

DETAILED DESCRIPTION OF THE DRAWINGS

Referring to FIGS. 1–4, a seat member indicated generally at 10 comprises a formed metal seat pan 12 which supports a foamed cushion member 14. The cushion 14 is covered by a seat cover 16 which has a "J"-shaped plastic welt member 18 sewn to it at 20. The welt member is resilient and preferably formed by extrusion from a plastic such as vinyl.

As previously discussed, the seat pan 12 and the welt member 18 are formed so as to provide an interlocking connection which prevents accidental or unauthorized removal of the seat cover 16 and welt 18 from the downwardly extending peripheral flange portion 22 of the seat pan 12. The interlocking takes place between a downwardly and outwardly extending lip 24 projecting from the short leg 26 of the "J"-shaped welt member 18 and a plurality of spaced, inwardly and upwardly extending tab portions 30 which are struck out of the vertical flange portion 22 as the seat pan is formed.

To achieve interlocking, and prevent accidental removal of the welt 18 from the seat pan vertical flange 22, the seat pan and the welt cooperate so as to resiliently deform the lip 24 of the welt member as it is assembled to the flange 22 by being forced upwardly thereon. In FIGS. 2 and 3, the assembly method is illustrated for the situation wherein the normal spacing between the bottom edge 24' of lip 24 and the bottom inside surface 26' of welt member 18 is less than the spacing of the uppermost portion 30' of the tab 30 from the lower edge 22' of the flange portion 22. Upward pressure on the welt 18 as well as sideways squeezing pressure applied by an assembler's finger, as shown in FIG. 3, will force the lip edge 24' to snap over the upper tab edge 30' and produce the interlocking connection shown in FIG. 4. The lip edge 24' and the tab edge 30' may be angled as shown in FIG. 2 to facilitate the camming of the edges over each other. As seen in FIGS. 2–4, the inverted U-shaped edge portion 32 of the seat pan 12 includes an inner vertical wall 34 which is spaced sufficiently close to outer wall or flange 22 to prevent a vandal or other unauthorized person from getting his fingers above the top inner leg portion 36 of the welt member to permit him to snap the lip edge 24' back over the tab edge 30'.

In the embodiment illustrated in FIGS. 5–7. the inner vertical wall 134 of the seat pan 112 is positioned so close to the tab 130 that the lip portion 124 of the welt member 118 will be resiliently squeezed or deformed to the left relative to leg 126, as shown in FIG. 5, to compress the welt and cause the edge 124' to snap over the tab edge 130' as the welt 118 is pushed upwardly. The relationship can be seen in FIG. 7 where distance "A" is less than distance "B". In this embodiment, the vertical spacing relationships of the welt edge 124' and tab edge 130', which were so important in the embodiment of FIGS. 2–4, are of no particular concern, since snap action locking is caused by squeezing or deforming the welt lip 124 in a horizontal direction. Once the edge 124' moves above the tab edge 130' as seen in FIG. 6, it will snap to the right due to its resiliency and assume the locking relationship with tab 130 shown in FIG. 7. It is also possible to provide snap action locking in both disclosed modes simultaneously. For example, the seat pan 12 in FIG. 1 can be formed so that all the tab edges 30' are equidistant from the lower flange edge 22' but with the cross-section of the inverted U-shaped edge flange 32 formed with a close spacing between walls 22,34, as in FIGS. 5–7, at the corners of the seat pan, and with a wider spacing (similar to FIGS. 2–4) in the elongated areas between the corners.

It will be obvious from the preceding description that a seat cover fastening system has been provided which is far superior to prior systems in that it is low cost and requires a minimum of labor. No expensive clips or the labor to put them on is required. The self tabs 30,130 involve no material cost since they are formed from the material of the seat pan. Although there would be a tooling cost to make the necessary punches, the actual punching operation can be accomplished simultaneously with the seat pan forming operation and thus does not add any extra cost. The assembly time would be far less than with prior systems since the welt is merely pressed into place. Since the welt material is quite rigid at room temperature it can be pre-heated to facilitate its being bent and manually forced into place. It would also be possible to tap it into position with a mallet if the edge flange had the V-shaped configuration of FIGS. 5–7.

I claim as my invention:

1. A seat cover fastening system comprising:
a formed seat pan having an inverted U-shaped peripheral edge portion, the outer vertical leg of said edge portion having a plurality of inwardly and upwardly directed tabs struck out of its surface at spaced locations around said edge portion which are located above the bottom of said vertical leg; seat cover material attached at its edges to a resilient trim strip having a generally J-shaped configuration and including an outer leg which is long and an inner leg which is short, the inner leg having a lip portion formed at its upper end which extends downwardly and outwardly toward said outer leg, said seat cover material being attached to said outer leg and extending upwardly therefrom, and said resilient trim strip covering the lower portion of said outer vertical leg so that its inner leg extends above said tabs and said lip portion extends downwardly toward the space between said tabs and said outer vertical leg so as to be interlocked therewith.

2. A seat cover fastening system according to claim 1 wherein the distance between the lower edge of said lip portion and the bottom inside surface of the trim strip is less than the distance between the top edges of said tabs and the bottom edges of the outer vertical leg of the seat pan.

3. A seat cover fastening system according to claim 2 wherein the lower edge of said lip portion is horizontally spaced from said inner leg.

4. A seat cover fastening system according to claim 3 wherein said lip portion is horizontally spaced from said inner leg by a distance generally equal to the thickness of said tabs.

5. A seat cover fastening system according to claim 2 wherein the lower edge of said lip portion and the upper edge of said tabs have complementary angled surfaces which are adapted to engage one another as the outer and inner legs of the trim strip are squeezed toward each other and the trim strip is forced upwardly relative to said outer vertical leg during assembly of said trim strip to said seat pan, said complementary angled surfaces serving to facilitate the camming of said edges over one another to permit said lower edge of said lip portion to be interlocked behind said tabs.

6. A seat cover fastening system according to claim 1 wherein the inverted U-shaped peripheral edge portion of said seat pan includes an inner vertical leg which is horizontally spaced from said tabs by a distance which is less than the maximum horizontal distance between any portion of the inner leg of said trim strip and any portion of the lip portion, whereby said lip portion will be compressed toward said inner leg as said trim strip is forced upwardly until said lip portion extends above said tabs, said tabs and inner vertical leg cooperating with each other and with said lip portion to retain said lip portion behind said tabs and prevent the disassembly of said trim strip from said seat pan.

* * * * *